Figure 1:
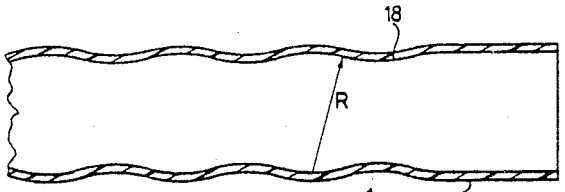
Figure 2:
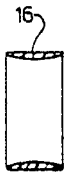
Figure 3:
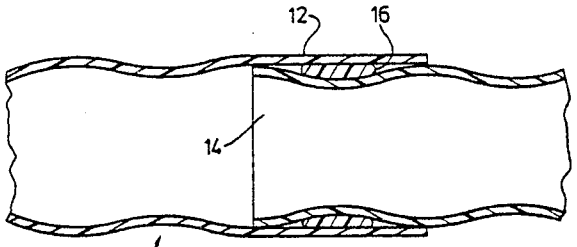
Figure 4:
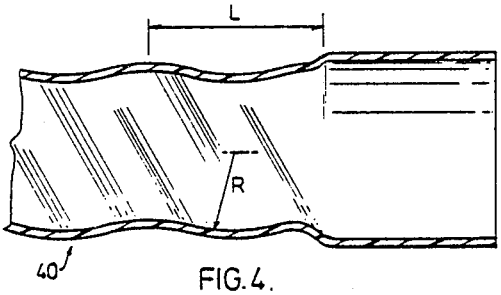
Figure 5:
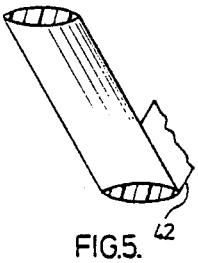

United States Defensive Publication [19] (H) [11] T103,901

Lupke et al. [43] Feb. 7, 1984

[54] WAVE WALLED PIPE

[76] Inventors: Manfred A. A. Lupke, 35 Ironshield Crescent; Gerd P. H. Lupke, 46 Stornoway Crescent, both of Thornhill, Ontario, Canada, L3T 3K7

[21] Appl. No.: 260,708

[22] Filed: May 5, 1981

[51] Int. Cl.[3] ..... F16L 11/06

[52] U.S. Cl. ..... 138/122

[57] ABSTRACT

A substantially stiff thin walled plastic pipe of thermoplastic material is provided having a wall of substantially uniform thickness, the longitudinal cross section profile of the wall comprising a wave form having a ratio of pitch length to amplitude of at least 3 to 1 and ranging to as high as 15 to 1.The wall wave form can be provided as at least one peripheral groove extending spirally along the pipe, to provide a substantially non-varying flow-section; or as succeeding annular grooves and crests, whereby the flow-section varies recurrently from a maximum to a minimum value. The pipe may be produced having an integral bell housing end portion, for joinder to a succeeding pipe length or it may be produced as a continuous length. Production of the continuous length pipe can be made on machines employing travelling mould blocks, or on rotary die types of machines.

10 Claims, 1 Sheet Drawing,

9 Pages Specification

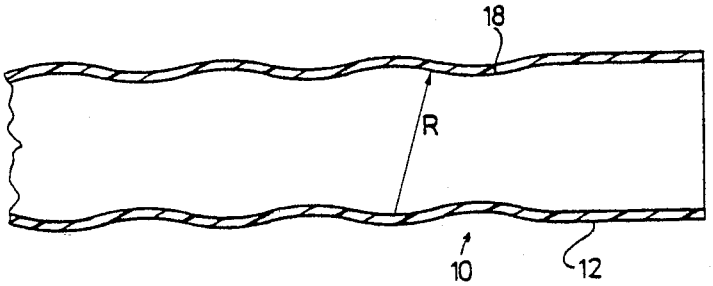

The file of this unexamined application may be inspected and copies thereof may be purchased (849 O.G. 1221, Apr. 9, 1968).